United States Patent [19]

Kominami et al.

[11] 4,396,818
[45] Aug. 2, 1983

[54] THYRISTOR OFF-TIME CONTROLLED INDUCTION HEATING APPARATUS BY DIFFERENTIATED THYRISTOR ANODE POTENTIAL

[75] Inventors: Hideyuki Kominami; Yoshio Ogino; Takumi Mizukawa; Takao Kobayashi, all Kadoma, Japan

[73] Assignee: Matsushita Electric Industrial Co., Japan

[21] Appl. No.: 273,415

[22] Filed: Jun. 15, 1981

Related U.S. Application Data

[63] Continuation of Ser. No. 75,734, Sep. 14, 1979, abandoned.

[30] Foreign Application Priority Data

Sep. 21, 1978 [JP] Japan ................................ 53-117341

[51] Int. Cl.³ .......................... H05B 6/08; H05B 6/12
[52] U.S. Cl. .......................... 219/10.77; 219/10.49 R; 363/28; 363/96; 323/243; 323/288
[58] Field of Search ..................... 219/10.77, 10.49 R; 363/135, 136, 96, 95, 57, 28, 27; 307/252 M, 252 T; 323/18, 225 C, 24, 237, 239, 242, 243, 272, 286, 287, 288

[56] References Cited

U.S. PATENT DOCUMENTS

| | | | |
|---|---|---|---|
| 3,781,505 | 12/1973 | Steigerwald | 219/10.77 X |
| 3,886,342 | 5/1975 | Peters, Jr. | 219/10.49 R |
| 4,010,342 | 3/1977 | Austin | 219/10.49 R |
| 4,115,676 | 9/1978 | Higuchi et al. | 219/10.77 X |
| 4,145,592 | 3/1979 | Mizukawa et al. | 219/10.77 X |
| 4,156,273 | 5/1979 | Sato | 363/80 X |

Primary Examiner—B.A. Reynolds
Assistant Examiner—Philip H. Leung
Attorney, Agent, or Firm—Lowe, King, Price & Becker

[57] ABSTRACT

An induction heating apparatus including a thyristor adapted to receive power from a power source, a gating control circuit for generating gating pulses for application to the gating control terminal of the thyristor, a commutating circuit which commutates off the thyristor, and a differentiator connected across the anode and cathode terminals of the thyristor to detect the power consumption of an inductively heated cooking ware. The gating control circuit comprises a gating pulse generator and a smoothing circuit for filtering the signal from the differentiator into a d-c signal which is compared with a reference level to detect the deviation of the power consumption from the reference value. The gating pulse generator is responsive to a potential at the anode of the thyristor to initiate timing action to determine the interpulse period or turn-off time of the thyristor and also responsive to the deviation of power consumption to vary the interpulse period.

7 Claims, 7 Drawing Figures

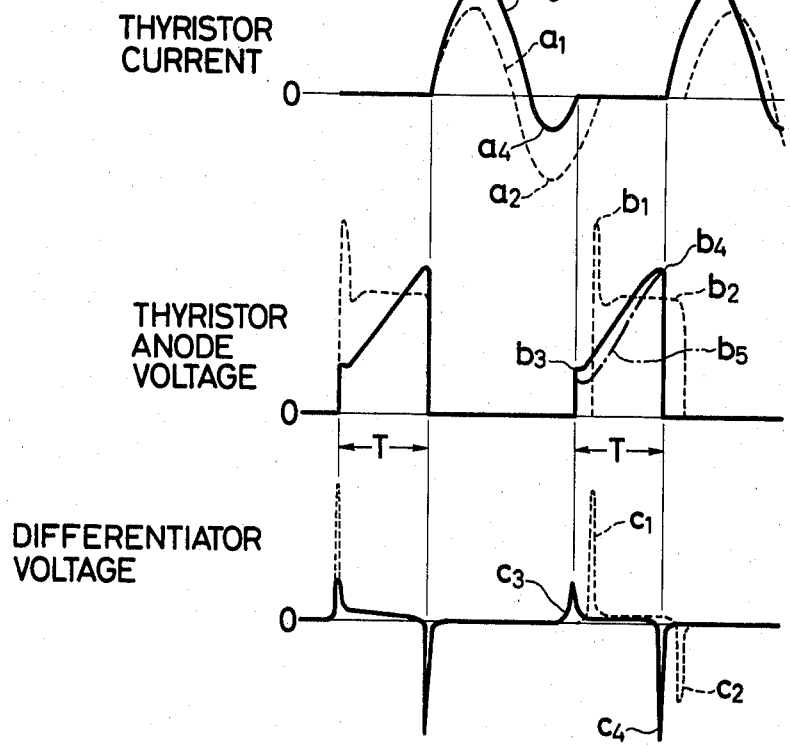
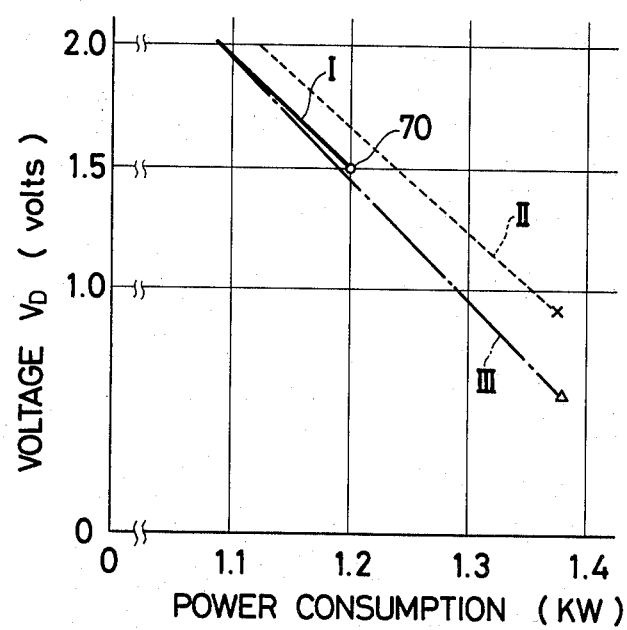

4,396,818

THYRISTOR OFF-TIME CONTROLLED INDUCTION HEATING APPARATUS BY DIFFERENTIATED THYRISTOR ANODE POTENTIAL

This is a continuation, of application Ser. No. 075,734, filed Sept. 14, 1979, abandoned.

BACKGROUND OF THE INVENTION

The present invention relates to induction heating apparatus, and more particularly to an induction heating cooking apparatus wherein the power consumption of a work load or cooking vessel is automatically controlled to a constant value regardless of the material of the cooking vessel and other factors that undesirably change the power consumption.

Cooking by induction heating necessitates the use of a ferromagnetic cooking ware or vessel to generate eddy currents which generate Joule heat $I^2R$ in the cooking ware. Actually, however, the thermal resistivity of the material of the ware differs according to the surface coating and the composition of the ferromagnetic material and as a result there is a difference in the amount of heat so generated for a constant power setting between different cooking wares. This applies also to a given cooking ware having variable contents. More specifically, when the cooking ware is heated without foodstuff therein for initial warm-up operation, the power consumption is considerably greater than when it is filled.

SUMMARY OF THE INVENTION

An object of the present invention is therefore to provide an induction heating apparatus which assures a constant amount of power consumption over a range of different loading conditions of the apparatus.

The induction heating apparatus of the invention comprises a thyristor having its anode and cathode terminals connected to receive power from a power source, a gating control circuit which supplies gating pulses to the gating control terminal of the thyristor to render it periodically conductive at an ultrasonic frequency, and a commutating circuit for commutating off the thyristor in response to a current generated upon the conduction of the thyristor in response to the application thereto of each gating pulse. At the initiation of the nonconductive period of the thyristor, the anode potential thereof rises sharply from zero to a certain positive level and continues to increase with time to a higher level until the termination of the nonconductive period. The present invention is based on the fact that the difference between the anode potential at the initiation of the nonconductive period and the anode potential at the termination thereof is correlated to the power consumption of the cooking ware being used. For this purpose, the apparatus of the invention employs a differentiator circuit connected across the anode and cathode terminals of the thyristor to generate a differentiated output in response to the leading and trailing edges of the thyristor anode potential. The differentiated signals are filtered or smoothed out into a corresponding d-c signal so that the latter represents the power consumption of a particular cooking ware. This d-c signal is compared with a reference value corresponding to a reference power consumption level to derive an error correction signal which is an indication of the deviation of the power consumption from the standard setting. The error correction signal is used to control the interpulse period of the gating pulses.

The power representative d-c signal has a large value when the load is considerably small. Thus, the d-c signal can be used to detect when a small utensil such as spoon or fork is inadvertently placed on the cook top to inhibit the gating pulses at periodic intervals until the inadvertently placed load is replaced with a normal cooking ware.

BRIEF DESCRIPTION OF THE DRAWINGS

The invention will be further described by example with reference to the accompanying drawings, in which:

FIG. 2 is an illustration of waveforms appearing in the circuit of FIG. 1;

FIG. 3 is a graphic illustration of the correlation between power consumption of various cooking wares and d-c voltages derived from the smoothing circuit of FIG. 1;

DETAILED DESCRIPTION

Figure 1:
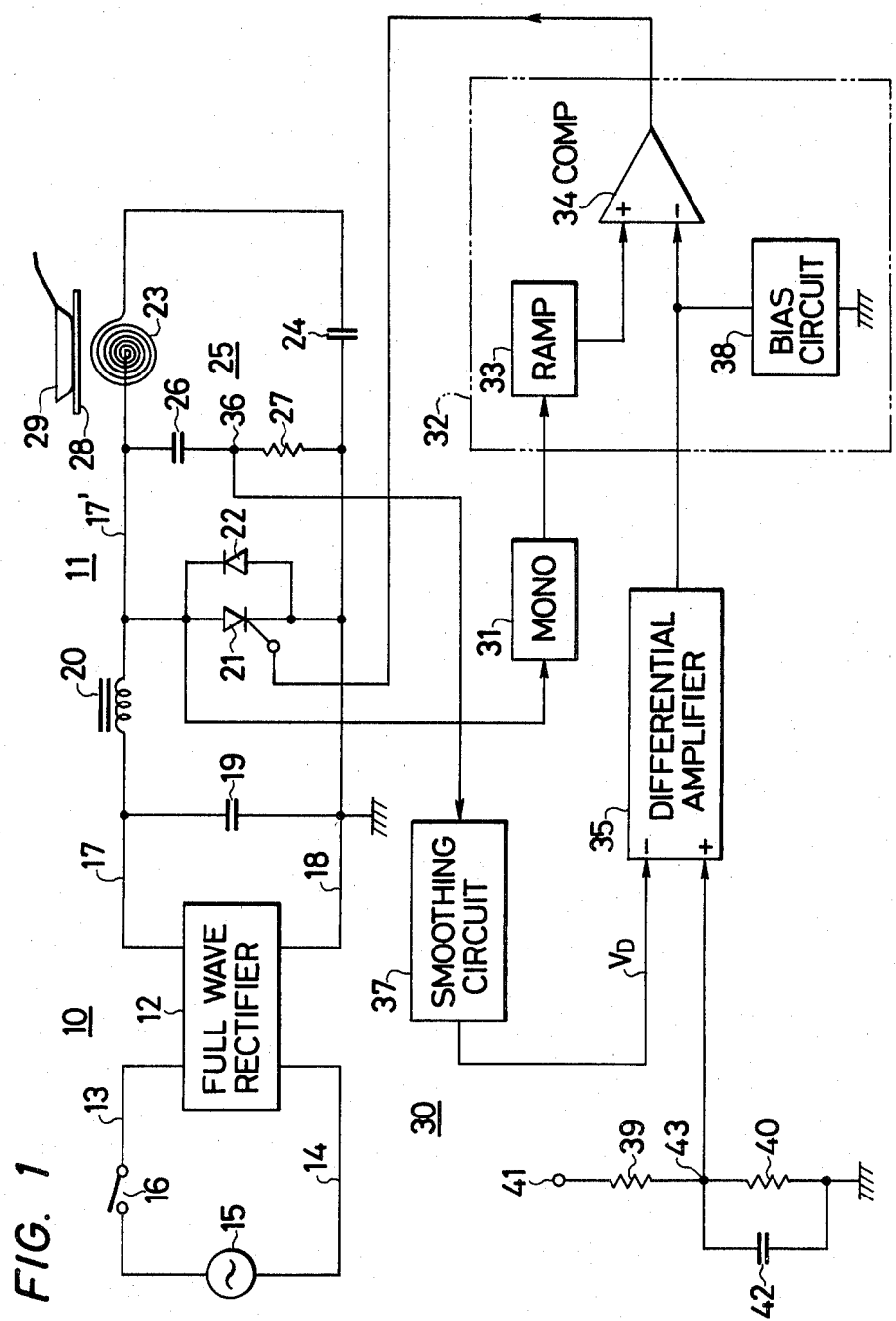
FIG. 1 is a schematic block diagram of an embodiment of the present invention.

The induction heating cooking apparatus shown in FIG. 1 includes a d-c power supply indicated generally at 10 for the high frequency inverter indicated generally at 11. The d-c power supply 10 comprises a full wave rectifier 12 having a pair of input terminals 13 and 14 that are adapted to be connected across a source of alternating current electric potential 15 through a power switch 16. The d-c power supply 10 supplies a d-c voltage between its output terminals 17 and 18 and the unidirectional output voltage is filtered or smoothed by a suitable filter circuit including a filter capacitor 19 connected directly between the positive d-c supply terminal 17 and the negative d-c supply terminal 18, but also including a filter inductor 20 connected in series with the terminal 17. These components constitute the d-c power supply for the inverter circuit 11 and establish an inverter power supply terminal 17'.

Although the inverter circuit 11 may have various circuit configurations, a single thyristor configuration is illustrated. The inverter comprises a thyristor 21 and a feedback or recovery diode 22 connected in an inverse parallel relation to each other between the inverter power supply terminals 17' and 18, and a series circuit connected across the terminals 17' and 18 including a commutating inductor or induction heating work coil 23 of the flat spirally wound type and a commutating capacitor 24. Further including in the inverter circuit 11 is a differentiator circuit 25 comprising a capacitor 26 and a resistor 27 connected in series between the terminals 17' and 18.

The work coil 23 is mounted below a ceramic cook top 28 on which a work load or cooking vessel 29 is shown placed to be inductively coupled with the work coil for generating eddy currents therein by the action of high frequency electromagnetic fields established by the current through the coil 23.

This high frequency current is generated by switching the thryistor 21 at a high frequency typically in the ultrasonic range. The thyristor is a unidirectional conducting gate controlled switching device wherein conduction through the device can be initiated when the anode is positive with respect to the cathode by the application of a gating signal to its gating control electrode, but therefore the gating signal loses control over conduction through the device and in order to render it nonconductive or commutate it off it is necessary to reduce the current through the device below the holding current or reverse bias the device by making the anode potential negative with respect to the cathode potential.

The gating signals for rendering the thyristor conductive are generated in a gating control circuit indicated generally at 30. In order for the thyristor 21 to commutate off, the inductor 23 and capacitor 24 are so chosen that they constitute a commutating circuit that supplies a reverse current through the recovery diode 22 in response to a forward current supplied thereto in response to the application of each gating signal to the thyristor. At the initial start of the inverter circuit and subsequently during the period between successive gating signals, the anode potential of the thyristor is rendered positive relative to its cathode potential and this positive anode potential is used to initiate a timing action to allow the thyristor to turn off by the reverse voltage created by the reverse commutating current.

For this purpose the gating control circuit 30 is responsive to the leading edge of the anode potential of the thyrsitor 21 and comprises monostable multivibrator 31 or a suitable circuit that senses the leading edge of the anode potential and produces an output for a ramp generator 33 which, with a comparator 34, constitute a pulse-width modulator pulse oscillator 32. The output voltage from the ramp generator 33 increases linearly in response to the sensed leading edge of the thyristor anode potential and is supplied to the noninverting input of the comparator 34 which receives at its inverting input a variable reference voltage from a differential amplifier 35. The output of the comparator 34 remains low when the instantaneous values of the ramp voltage is smaller than the reference input at the comparator inverting input and goes high when the situation is reversed. Therefore, the output of the oscillator 34 is a train of pulses of which the interpulse period T is corrected in response to the output of the differential amplifier 35 and the repetition frequency is primarily determined by the tuned frequency of the commutating circuit. The output of the oscillator 32 is supplied to the gating control terminal of the thyristor 21 to initiate the conduction of a half wave of current in response to each gating pulse. This half wave of current passes through the commutating circuit in the forward direction, causing the latter circuit to produce a reverse half wave of current which is allowed to pass through the diode 22, thus completing an oscillation cycle. At the end of the reverse commutating current, the thyristor 21 is allowed to commutate off or turn off during the interpulse period of the gating pulses so that its anode potential sharply rises from zero to a certain positive level depending on the presence or absence of the utensil load 29 and on the material of the load. This positive anode potential is again sensed by the monostable 31 and the above process is repeated to generate successive gating pulses, and therefore a high frequency oscillating current is generated in the work coil 23 with which the cooking ware is inductively heated. The pulse oscillator 32 further includes a d-c bias circuit 38 which biases the comparator inverting input so that the interpulse period of the gating pulses corresponding to the power consumption of 1.2 kilowatts when the output signal from the differential amplifier 35 is zero. Therefore, the bias circuit 38 permits the pulse oscillator 32 to provide a train of standard gating pulses which in turn results in a d-c voltage of 1.5 volts from a smoothing circuit 37. The interpulse period of the standard gating pulses is, of course, greater than the inherent or published turn-off time of the thyristor so that it is allowed to turn off with a safety margin. In the absence of a utensil load on the cook top 28 a positive current, shown in broken lines a1 in FIG. 2, flows through the thyristor 21 in the forward direction and through the commutating circuit which in response thereto causes a negative current $a_2$ to flow through the diode 22 and in this case the currents a1 and a2 have equal amplitudes. At the termination of the oscillating current a2, the thyristor is turned off and as a result the anode potential thereof rises sharply from zero potential level to a point indicated at b1 and then drops to a level b2 which continues until the initiation of a subsequent oscillating cycle. In the presence of a utensil load 29 on the cook top, on the other hand, the positive halfwave current becomes as shown in a solid-line waveform a3 having a greater amplitude than the negative current a4 because of the power delivered to the work load and contributes to the generation of heat therein. The oscillating current in the presence of the work load terminates earlier than the current generated in the absence of the load. At the termination of the oscillating current a4, the anode potential of the thyristor rises sharply to a positive level indicated at b3 and continues to rise to a higher positive level indicated at b4.

The difference between positive levels b3 and b4 is found to be inversely proportional to the amount of power consumed by the work load and can be used to modify the interpulse period of gating signals for the thyristor 21 in order to compensate for differences in power consumption between different utensil loads. As shown in FIG. 2, the potential at the junction point 36 of the differentiator 25 appears as a positive spike c1 and a negative spike c2 of a smaller magnitude than spike c1 generated respectively in response to the leading and trailing edges of the anode potential when no utensil load is present. On the other hand, when the utensil is present, the potential at the junction point 36 appears as a positive spike c3 and a negative spike c4 of a greater magnitude than c3. Therefore, it will be appreciated that by filtering the differentiator output and biasing the filtered signal to a certain d-c level, a d-c output corresponding to the power consumption will be generated.

Figure 4:
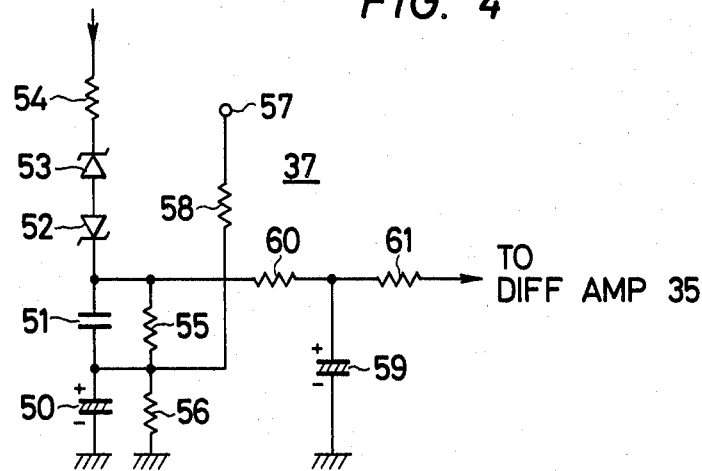
FIG. 4 is a circuit diagram of the smoothing circuit of FIG. 1.

In order to generate this d-c signal, the junction point 36 of the differentiator is supplied as an input to the biased smoothing circuit 37 which comprises, as shown in FIG. 4, a series circuit comprising an electrolytic capacitor 50 and a filter capacitor 51 connected in series to the junction point 36 through a pair of oppositely series connected Zener diodes 52 and 53 and a resistor 54. The capacitors 50 and 51 are shunted by a resistor network including resistors 55 and 56 whose junction point is connected to the junction point of the capacitors 50 and 51 and further connected to a voltage supply terminal 57 through a resistor 58 so that the electrolytic capacitor 50 is normally charged to a suitable positive bias potential. The differentiator output voltage from the junction point 36 charges the capacitor 51 and develops a power-representative voltage of different polarities depending on the presence and absence of the work load. This voltage is positively biased to the voltage developed in the capacitor 50 and the combined output which appears across the resistors 55 and 56. This positive-biased d-c voltage thus represents the power consumption of the utensil employed and is further smoothed out to eliminate the ripple components by means of a filter circuit comprising an electrolytic capacitor 59 connected between ground and a junction point of resistors 60 and 61 connected in series with the resistors 55 and 56 to the inverting input terminal of the differential amplifier 35. The differential amplifier 35 receives at its noninverting input terminal a reference voltage of 1.5 volts from a voltage divider comprising a resistors 39 and 40 connected in series between a d-c voltage supply terminal 41 and ground and a capacitor 42 connected in parallel with the resistor 40.

As graphically illustrated in FIG. 3, the d-c voltage $V_D$ from the smoothing circuit 37 is plotted as a function of power consumption for utensil loads of different material located at various points from the center of the work coil. Numerals I, II and III represent the characteristics of porcelain enameled stainless steel pan, cast iron pan, and copper plated stainless steel pan, respectively, with the porcelain enameled stainless steel pan being calibrated to a power consumption of 1.2 kilowatts to serve as a reference power indicated by a circle dot 70. As seen from FIG. 3, the power consumption of the cast iron pan and the copper plated stainless steel pan is approximately 1.38 kilowatts which deviates by an amount of 0.18 kilowatt from the reference power of 1.2 kilowatts. The differences in power consumption are accounted for by the difference in the electrical resistance of the material of the pans. When a reference pan is used for cooking, the output of the differential amplifier is zero so that thyristor is supplied with standard gating pulses. When a pan other than the reference pan is used, the output of the differential amplifier 35 is an indication of the difference in power consumption between it and the reference pan, so that the interpulse period T is increased which in turn decreases the power consumption until the output of the differential amplifier 35 reduces to zero where the power consumption is approximately 1.2 kilowatts.

Figure 5:
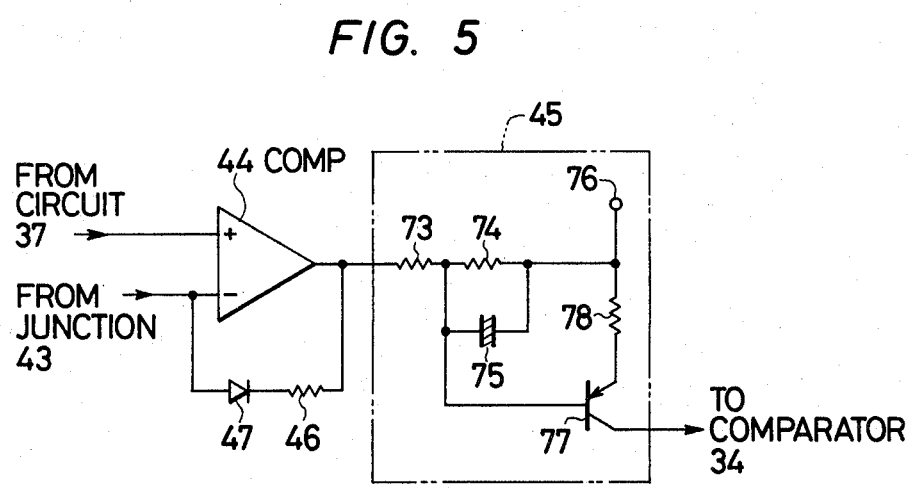
FIG. 5 is a circuit diagram of the differential amplifier of FIG. 1.

Preferably, the differential amplifier 35 comprises as shown in FIG. 5 a comparator 44 having its noninverting input terminal connected to the output of the smoothing circuit 37 and its inverting input terminal connected to the junction point 43. The output of the comparator 44 is connected to a second smoothing circuit 45 whose output is connected to the inverting input of the comparator 34. The output of the comparator 44 is further connected by a feedback circuit including a resistor 46 and a diode 47 so poled as to reduce the voltage at the junction point 43 by the output of the comparator 44 when the potential $V_D$ falls below the reference voltage at the junction 43. The comparator 44 generates an output at one of two discrete values depending on the voltage $V_D$ relative to the reference level and this output is generated for each oscillation cycle of the inverter circuit 11. The smoothing circuit 45 includes resistors 73 and 74 connected in series between the output of the comparator 44 and a voltage supply terminal 76, a filter capacitor 75 connected in parallel with the resistor 74, and a transistor 77 having its base biased with a filtered potential developed at the junction point of the resistors 73 and 74. The transistor 77 draws current from the voltage supply terminal 76 through a collector load resistor 78 and develops a voltage at the emitter, which voltage is inverse in polarity to that applied to its base. The inverted filtered d-c signal is the error correction signal which is applied to the comparator 34.

Figure 6:
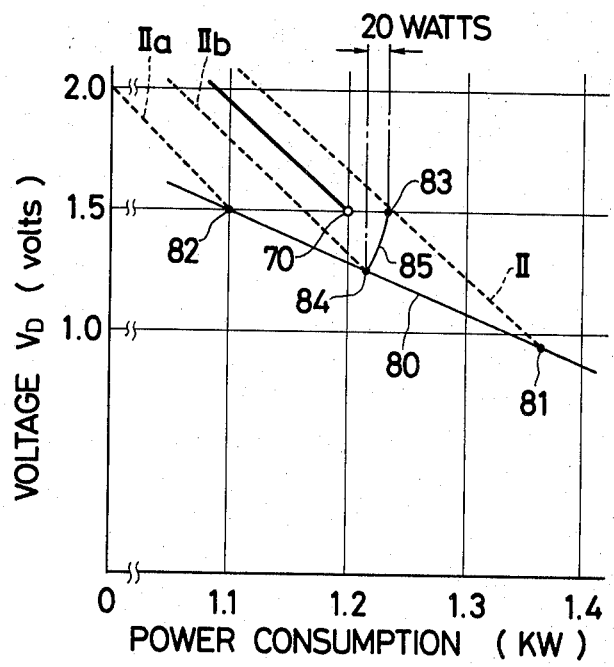
FIG. 6 is a graphic illustration of the operating characteristic of the embodiment of FIG. 1.

The advantage of the present invention is understood with reference to a graphic diagram of FIG. 6 which illustrates the case in which a cast iron pan is employed. At the instant the cast iron pan is placed on the cook top, the d-c output $V_D$ is approximately 0.8 volts, and the comparator 44 generates a zero volt output. It is assumed that if the feedback path of comparator 44 is not provided, this zero output from the comparator 44 will cause the interpulse period T to increase such that the d-c voltage $V_D$ increases to 1.5 volts. In other words, the power consumption point shifts from a point 81 to a point 82 along a line 80 and the operating characteristic of the cast iron pan under this condition is shifted from the line II to a line IIa. Under these circumstances, a displacement of the pan from the center of the work coil 23 results in an increase in the power consumption by error corrective action and the line IIa shifts to the right until it overlaps the original line II where its power consumption point 83 corresponds to 1.24 kilowatts. By the provision of the feedback path to the comparator 44 with the pan being replaced to the center of the coil 23, the zero volt output from the comparator 44 causes the diode 47 to conduct so that it reduces the reference voltage at the inverting input thereof. As a result, a positive output is delivered from the comparator 44 and filtered by the circuit 45. By the reduction of the reference voltage, the line IIa is shifted to a line IIb and the power consumption point 82 is shifted to a point 84 on the line 80 corresponding to a power consumption of 1.22 kilowatts. As a result, the power consumption point will shift from points 84 to 83 along a curved line 85 as a function of displacement from the center of coil 23 when the feedback circuit of comparator 44 is provided, so that power consumption undergoes a change from 1.22 to 1.24 kilowatts, a variation of only 20 watts, even though the pan is not correctly placed over the center of the coil 23.

In this way, the power consumption of any heated load that considerably exceeds the reference power level of 1.2 kilowatts can be effectively controlled. This is particularly advantageous when the cooking vessel is heated inadvertently without foodstuff therein and in this case the thyristor anode voltage is slightly reduced as indicated at 65 in FIG. 2. Further, a momentary increase in power consumption which occurs when the load is removed from the cooking top can also be suppressed.

Figure 7:
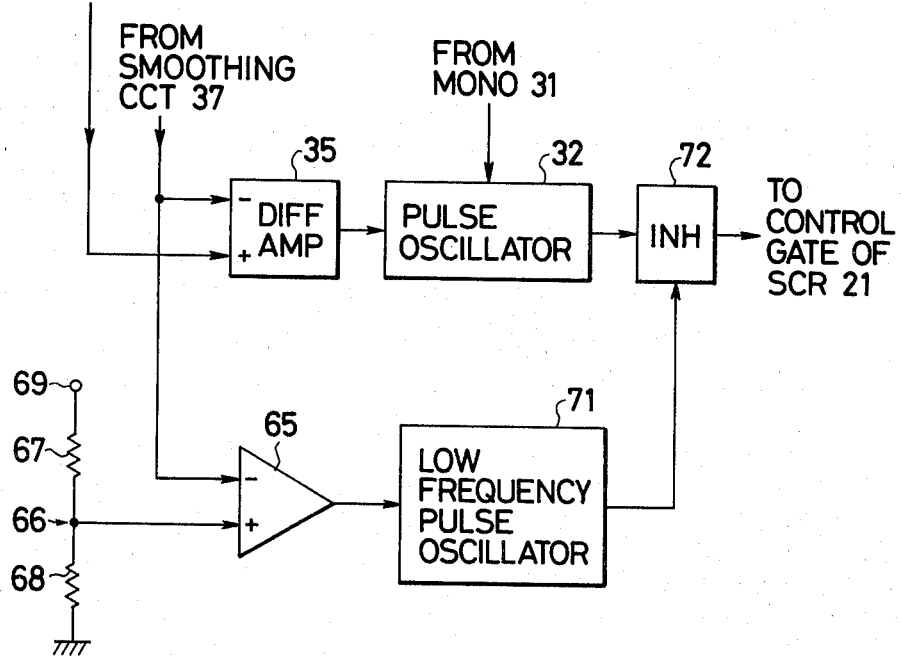
FIG. 7 is a block diagram of a modification of the FIG. 1 embodiment.

Since the d-c voltage $V_D$ is correlated with the power consumption and in particular a large value of $V_D$ is derived when power consumption level is considerably low, the presence of an inadvertently placed utensil on the cook top such as forks or spoons can be easily detected by sensing when $V_D$ exceeds a predetermined level. The embodiment shown in FIG. 7 includes additionally a small utensil detector circuit which comprises a comparator 65 having its inverting input connected to the smoothing circuit 37 and its noninverting input connected to a reference voltage source 66 formed by resistors 67 and 68 which are connected between a voltage supply terminal 69 and ground. The output of the comparator 65 is connected to a low frequency pulse oscillator 71 which generates a train of inhibit pulses at a frequency much lower than the frequency of the high frequency oscillating current of the inverter circuit 11. This inhibit pulse is used to control an inhibit gate 72 provided in the circuit between the output of pulse oscillator 32 and the control gate of the thyristor 21. When an undesirable small utensil is inadvertently placed on the cook top, the voltage $V_D$ exceeds the reference voltage of the source 66 and the comparator 65 generates a high voltage output which enables the oscillator 71 to generate the periodic inhibit pulses, so that the high frequency oscillation is periodically interrupted and the utensil so placed on the cook top is not considerably heated. The high frequency oscillation so interrupted serves as an interrogating signal for purposes of detecting the removal of the undesirable utensil from the cook top so as to initiate normal heating operation. More specifically, when the small utensil is replaced with a normal load, the voltage $V_D$ will fall below the reference level to cause the comparator 65 output to switch to a low voltage level to turn off the inhibit pulse oscillator 71.

What is claimed is:

1. An induction heating apparatus for supplying constant power to a variable heating load comprising a thyristor connected to receive power from a power source, a commutating circuit including an induction heating coil and a capacitor connected to said thyristor for commutating same, a fixed time constant differentiator connected across the anode and cathode terminals of said thyristor for differentiating a potential developed across said anode and cathode terminals to develop a load power responsive signal, a smoothing circuit for converting said load power responsive signal into a corresponding d-c signal, means for generating a deviation signal representative of the deviation of said d-c signal from a reference value corresponding to a reference power level, and means for supplying the gating control terminal of said thyristor with gating pulses at a frequency in the ultrasonic range with the period between successive ones of said gating pulses being variable as a function of said deviation signal.

2. An induction heating apparatus as claimed in claim 1, wherein said deviation signal generating means comprises means for causing said deviation signal to vary inversely as a function of said d-c signal.

3. An induction heating apparatus as claimed in claim 1, wherein said means for supplying gating pulses comprises means for initiating said interpulse period when the potential across said anode and cathode terminals of said thyristor rises from zero to a certain voltage level.

4. An induction heating apparatus as claimed in claim 1 or 2, wherein said deviation signal generating means comprises a comparator having a first input terminal connected to receive said d-c signal and a second input terminal connected to receive a reference voltage corresponding to said reference power level, a feedback circuit connecting the output terminal of said comparator to said second input terminal for reducing the potential at said second input terminal in response to an output signal from the output terminal of said comparator, and a second smoothing circuit connected to the output terminal of said comparator for application of an output signal therefrom to said gating pulse supplying means for varying said interpulse period of the gating pulses.

5. An induction heating apparatus as claimed in claim 1, wherein the smoothing circuit comprises a filter capacitor and d-c biasing means connected in series to receive said differentiated potential from said differentiator.

6. An induction heating apparatus as claimed in claim 1, wherein said differentiator comprises a resistor and a capacitor connected in series between the anode and cathode terminals of said thyristor, the junction point of said resistor and capacitor being connected to the input of said smoothing circuit.

7. An induction heating apparatus as claimed in claim 1, further comprising a comparator having a first input terminal connected to receive said d-c signal from said smoothing circuit and a second input terminal connected to receive a reference voltage corresponding to the amount of power which is generated when an undesirable small load is inadvertently heated by said induction heating coil by induction, a low frequency pulse oscillator for generating inhibit pulses at a frequency much lower than the frequency of said gating pulses, and an inhibit gate for periodically interrupting the supply of said gating pulses to said gating control terminal of said thyristor in response to said inhibit pulses.

* * * * *